United States Patent [19]

Fujimoto et al.

[11] Patent Number: 4,803,243

[45] Date of Patent: Feb. 7, 1989

[54] BLOCK-GRAFT COPOLYMER

[75] Inventors: Teruo Fujimoto; Mikio Shiono; Osamu Watanabe, all of Nagaoka; Koichi Ito, Higashikurume, all of Japan

[73] Assignee: Shin-Etsu Chemical Co., Ltd., Tokyo, Japan

[21] Appl. No.: 30,074

[22] Filed: Mar. 25, 1987

[30] Foreign Application Priority Data

Mar. 26, 1986 [JP] Japan ................. 61-69366

[51] Int. Cl.[4] .......................... C08F 287/00
[52] U.S. Cl. ..................... 525/100; 525/271; 525/288
[58] Field of Search ............. 525/100, 288, 271

[56] References Cited

U.S. PATENT DOCUMENTS 3,485,660 12/1969 Engelhardt .................. 525/288
4,693,935 9/1987 Mazurek ...................... 525/288

FOREIGN PATENT DOCUMENTS 61-250015 11/1986 Japan ..................... 525/288

Primary Examiner—Wilbert J. Briggs, Sr.

Attorney, Agent, or Firm—Foley & Lardner, Schwartz, Jeffery, Schwaab, Mack, Blumenthal & Evans

[57] ABSTRACT

Disclosed are a block-graft copolymer comprising a polymer block having a repeating unit represented by General Formula (I):

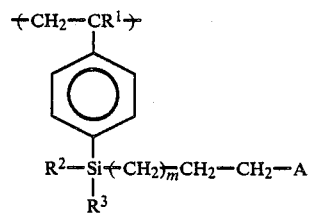

wherein A is a side chain and represents an organopolisiloxane chain, a polyacrylate chain, a polymethacrylate chain, polydiene chain, etc.

and a process for producing the same. This block-graft copolymer can have various performances such as oxygen enrichment performance, biocompatibility, depending on the kind of side chains.

4 Claims, 3 Drawing Sheets

BLOCK-GRAFT COPOLYMER

BACKGROUND OF THE INVENTION

This invention relates to a block-graft copolymer useful as a material for various functional membranes including an oxygen enrichment membrane, and a process for producing the same.

At present, many attempts have been made on the development of functional polymer materials used for various purposes.

Dimethylpolysiloxane is known as a material for high enrichment of oxygen, but, when used in the form of a thin membrane, it can not stand use because of its weak cohesion. For this reason, it is attempted in the present state of the art to form the material as a block copolymer to remedy its disadvantage. However, although the block copolymer is useful for increasing mechanical strength, only the compositional proportion held by dimethyl polysiloxane affects oxygen enrichment and permeability, raising a problem that the oxygen enrichment performance decreases in proportion thereto. Dimethylpolysiloxane and high molecular compounds having an amino group or carboxyl group have biocompatibility, and some of them are used as biomedical materials such an antithrombrogenic materials, bioseparator materials and cell culturing materials. In particular, recently noted are high molecular materials, particularly block copolymers, containing the above macromolecule as a component, which is a multi-phase polymer with a clear micro domain structure. However, in order to obtain the block copolymer finely divided into multiphases, no other way is available than producing it according to a living anionic polymerization method, and also the manner of combination of monomers is restricted. Moreover, since the domain size of the microphase-separated gyration is governed by the radius of inertia, there is a problem that the domain size in the block copolymer can be controlled only with difficulty.

SUMMARY OF THE INVENTION

An object of this invention is to provide a highly functional high molecular material that can solve these problems.

To solve the above problems, as a functional high molecular material applicable for use in wider range, this invention provides a block-graft copolymer comprising:

a polymer block having a repeating unit represented by General Formula (I):

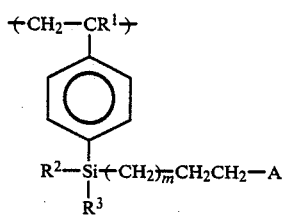

wherein $R^1$ represents a hydrogen atom, methyl group or ethyl group; $R^2$ and $R^3$ may be the same or different and each represent an alkyl group having 1 to 3 carbon atoms or phenyl group; m represent an integer of 0 to 4; and A represents any one of polymer residual groups represented by General Formulas (II) to (IV) shown below,

wherein $R^4$ may be the same or different and each represent methyl group, ethyl group or phenyl group; $R^5$ is as defined for $R^4$ or represents a group represented by the formula $-Si(R^4)_3$; and n is an integer of 1 to 1,000,

wherein $R^6$ represents a hydrogen atom or methyl group; and B represents a group represented by the formula $-COOR^2$, where $R^2$ is as defined above, $-CH=CH_2$ or $-C(CH_3)=CH_2$; Y represents cumyl group, n-butyl group, s-butyl group or benzophenone residual group; and n is as defined above,

wherein Y represents cumyl group, n-butyl group or s-butyl group; and n is as defined above, and having preferably a polymerization degree of 10 or more; and at least one of polymer blocks having a repeating unit represented by General Formula (V):

wherein $R^7$ represents a hydrogen atom, methyl group or ethyl group; M represents at least one selected from a group represented by the formula $-CH=CH_2$, $-C(CH_3)=CH_2$, $-COOCH_3$ or $-COOC_2H_5$ and a phenyl group, and having preferably a polymerization degree of 300 or more.

DETAILED DESCRIPTION OF THE PREFERRED EMBODIMENTS

Figure 1:
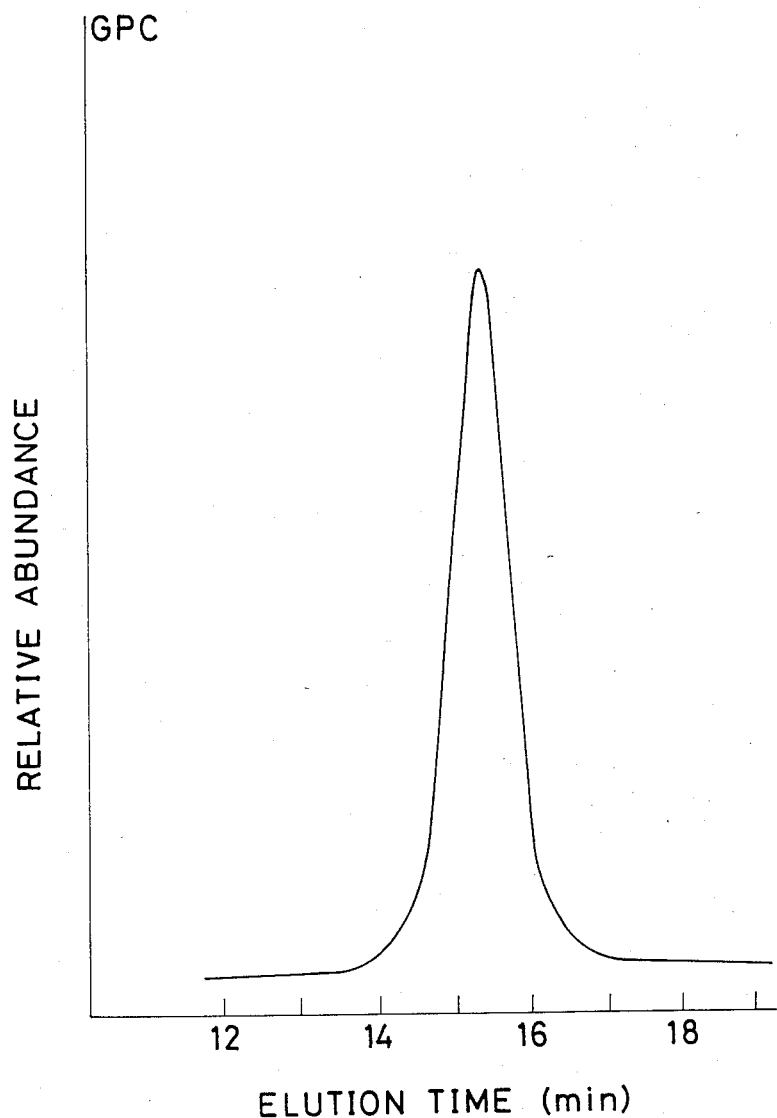
FIG. 1 shows a GPC elution curve of a block copolymer before grafted, obtained in Example 1.

The block-graft copolymer obtained in this invention is characterized by a clear microphase structure, and functions for particular purposes can be imparted to the backbone chain and graft polymer chains or branched polymer chains (hereinafter referred to simply as "side chains") which are divided into multi-phases.

In particular, mechanical strength and a function of cohesion of the block-graft copolymer can be imparted to the backbone chain, and oxygen enrichment performance and affinity for blood or the like can be imparted to the side chains by selecting them, thereby providing a functional high molecular material having a wider field of application and higher performance as compared with conventional graft copolymers.

Speaking specifically according to purposes, dimethylpolysiloxane having a smaller molecular weight may be selected as a side chain of the block-graft copolymer of this invention and attached to the backbone chain in a large quantity, whereby backbone chains and side chains can be divided to form micro-phases. Moreover, the increase of the free volume by virtue of the side chains results in the increase of the oxygen permeability, thus making it possible to produce an oxygen enrichment membrane having a high performance.

Still moreover, the block-graft copolymer of this invention can be used for various biomedical materials by selecting components having biocompatibility. In such a case, the position, length and number of the side chain may be controlled to make the domain of the clear microphase structure uniformly dispersed, and also the domain size thereof can be controlled in a wide range. Accordingly, it is possible to select molecular designs according to purposes, and also to eliminate the disadvantage that in the conventional graft polymers the radius of inertia is so small for their molecular weight as to be weak.

The above block-graft polymer of this invention can be produced by first synthesizing a block copolymer constituting a backbone chain, and then attaching a side chain A to a pendant vinyl group possessed by the block copolymer.

The block copolymer used as a starting material is a block copolymer comprising a polymer block having a repeating unit represented by General Formula (VI):

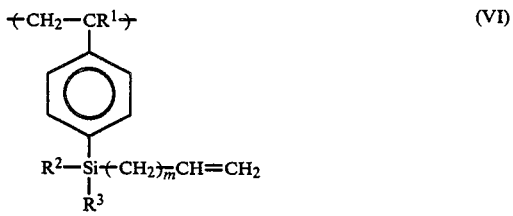

(VI)

wherein $R^1$, $R^2$, $R^3$ and m have the same meaning as in General Formula (I), and having preferably a polymerization degree of 10 or more; and at least one of polymer blocks having a repeating unit represented by General Formula (V) and having preferably a polymerization degree of 300 or more.

Examples of the process for producing the block copolymer which is a starting material of this invention and the process for producing the block-graft copolymer of this invention will be described below in sequence.

SYNTHESIS OF BLOCK COPOLYMER

The block copolymer can be produced by, for example, a process in which an alkenylsilyl group-containing styrene compound represented by General Formula (VII):

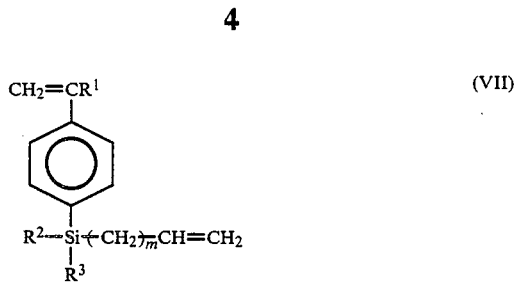

(VII)

wherein $R^1$, $R^2$, $R^3$ and m are as defined above, and at least one of the compounds represented by General Formula (VIII):

(VIII)

wherein $R^7$ and M are as defined above, are successively addition-polymerized according to an anionic polymerization by use of an organic metallic compound as an initiator, wherein at least the polymerization of the alkenylsilyl group-containing styrene compound of General Formula (VII) is carried out in the presence of N-methylpyrrolidine.

Examples of the compound represented by General Formula (VII) may include 4-vinylphenyldimethylvinylsilane, 4-vinylphenyldimethylallylsilane, 4-vinylphenyldimethyl-1-butenylsilane, 4-(1-methylethenyl)-phenyldimethylvinylsilane, 4-(1-methylethenyl)phenyldimethyl-allylsilane, 4-vinylphenylmethylethylvinylsilane, 4-vinylphenylmethylphenylvinylsilane and the like, and one of them may be contained in one polymer block. In these compounds of General Formula (VII), according to the above process, the ethylenically unsaturated group attached to the benzene ring, which is one of the two ethylenically unsaturated groups in the molecule, is predominantly polymerized, and the vinyl group contained in the alkenylsilyl group remains unreacted, whereupon the polymer block consisting of the unit represented by General Formula (VI) can be formed.

Examples of the monomer compound of General Formula (VIII) used for the formation of the other polymer block may include dienes such as butadiene and isoprene; vinyl aromatic hydrocarbon compounds such as styrene and α-methylstyrene; acrylic or methacrylic acid esters such as methyl acrylate, methyl methacrylate, ethyl acrylate and ethyl methacrylate; etc.

The organic metallic compound which is an initiator used in the above process may include, for example, organic alkali metals such as cumyl cesium, cumyl potassium, benzyl sodium, benzyl potassium and benzyl cesium, and particularly preferable is cumyl cesium. Amount of the intiator to be used determines the molecular weight of a resulting polymer conjointly with the amount of the monomer compound to be charged. Accordingly, it should be selected depending on the desired molecular weight, and may be usually controlled to give a concentration of the order of $10^{-2}$ to $10^{-4}$ mol/lit. in a reaction mixture.

N-methylpyrrolidine is used preferably in the range of an equimolar to 10 time molar amount based on the initiator organic metallic compound. By virtue of N- methylpyrrolidine present in the reaction system, the ethylenically unsaturated group attached to the benzene ring is predominantly polymerized in the course of the polymerization of the alkenylsilyl group-containing compound of General Formula (VII), and the vinyl group contained in the alkenylsilyl group does not react to remain in the polymer.

The polymerization is, in general, carried out in an organic solvent, and the organic solvent to be used may include ether type solvents such as tetrahydrofuran, dioxane, tetrahydropyran, dimethoxyethane and diglyme, and particularly preferable is tetrahydrofuran. These solvents can be used singly or in combination of two or more of them.

The monomer compound used in the polymerization may be preferably in a concentration of 1 to 10% by weight in a reaction mixture, and the polymerization reaction may be preferably carried out under stirring at a temperature of $-78°$ to $-20°$ C. in a high vacuum of $10^{-5}$ Torr or less or in an atmosphere of an inert gas such as argon and nitrogen from which materials, such as water, injurious to the reaction have been removed by purification.

When initiating the polymerization, the solvent, the initiator, N-methylpyrrolidine and a first monomer compound are charged in a reaction vessel to carry out the reaction usually for about 10 minutes to 1 hour or so, whereby anionic polymerization may proceed to form a polymer block. Subsequently, a second monomer compound usually diluted with a solvent may be added to the reaction system to allow polymerization to further proceed, and a third monomer component may be optionally added and polymerized successively in the similar manner. Here, the alkenylsilyl group-containing compound of Formula (VII) may be used as the first monomer compound, and the compound of General Formula (VIII) may be used as the second monomer compound, or these may be used inversely. However, of the compounds of General Formula (VIII), acrylate and methacrylate can not be used as the first monomer compound. This is because the terminal anion in the polymer block comprising the acrylate or the like compounds to be formed has such low activity that another monomer compound can not be added to further extend another polymer block. Accordingly, the polymer block comprising a monomer such as acrylate can be introduced in the block copolymer only as a last block. Assuming as "a" the polymer block comprising the unit of General Formula (VI), and as "b", "b'" and so forth the polymer block comprising the repeating unit of Formula (V), a block copolymer of the type such as an ab type, a ba type, a bab type, a bab' type, etc. can be produced as desired, by selecting the order for the monomer compounds to be polymerized under the above conditions.

Upon completion of the necessary polymerization, a terminator such as methanol and ethyl bromide may be added to the reaction system to stop the reaction. The block copolymer thus formed can be purified and separated by subjecting the reaction mixture to precipitation and washing with use of methanol, followed by drying.

Yield of the block copolymer thus formed is substantially 100% based on the monomer compounds used, and molecular weight thereof (kinetic molecular weight) can be readily calculated from the weight of the monomer compounds used and the mole number of the initiator. Also, number average molecular weight ($\overline{Mn}$) can be measured using a membrane osmometer, and judgement on whether a desired product has been formed or not can be made based on infrared (IR) spectrum and $^1$H-NMR spectrum. Evaluation on the molecular weight distribution and on whether a possible precursor of the block copolymer is contained or not can be also made according to gel permeation chromatography (GPC).

Synthesis of block-graft copolymer

The block-graft copolymer of this invention can be obtained by attaching the side chain A to the vinyl group contained in the polymer back having the repeating unit of General Formula (VI) possessed by the block copolymer synthesized in the above manner. The following two processes can be exemplified as the process for attaching the side chain to the vinyl group.

Process (a)

The following is a process in which a reactive functional group-terminated polymer is reacted with the above vinyl group.

The functional group-terminated polymer may include an organosilicon compound terminated with a silicon-bonded hydrogen atom, represented by General Formula (IX):

wherein $R^4$, $R^5$ and n have the same meaning as in General Formula (II).

Specific examples thereof include pentamethyldisiloxane, bis(trimethylsiloxy)methylsilane, tris(trimethylsiloxy)silane, heptamethyl-1-hydrotrisiloxane, undecamethyl-1-hydropentasiloxane, tridecamethyl-1-hydrohexasiloxane, undecaethyl-1-hydropentasiloxane, 1,1,1,3,5,7,9,9-octamethyl-3,5,7-triphenylpentasiloxane and the like. Processes for producing these organosilicon compounds are well known to those skilled in the art.

The above block copolymer may be reacted with the above organosilicon compound containing a silicon-bonded hydrogen atom in the presence of a platinum catalyst such as chloroplatinic acid and platinum asbestos to obtain a block-graft copolymer in which the A in General Formula (I) comprises a side chain of General Formula (II). The reaction may be preferably carried out in a hydrocarbon type solvent such as benzene and toluene or the above-mentioned ether solvent such as THF, and may be carried out at a temperature not higher than reflux temperature for about 2 to 10 hours.

The product can be separated by pouring the reaction mixture into methanol to allow the formed polymer to precipitate, followed by drying. The resulting polymer can be purified by fractional precipitation carried out in a benzene-methanol system. Infrared spectrum, $^1$H-NMR spectrum and GPC can afford to make confirmation on whether a desired block-graft polymer has been formed.

Process (b)

The following is a process in which a carbanion-terminated polymer is subjected to an addition reaction with the above vinyl group.

The carbanion-terminated polymer can be prepared by anionic polymerization of at least one monomer selected from the group consisting of an acrylic or methacrylic acid ester compound represented by General Formula (X):

$$\begin{array}{c} R^6 \\ | \\ C=CH_2 \\ | \\ COOR^2 \end{array} \quad (X)$$

wherein $R^2$ and $R^6$ are the same as defined above, e.g., methyl acrylate, methyl methacrylate; dienes such as butadiene and isoprene; 4-vinylbenzyldimethylamine; and vinylpyridines such as 2-vinylpyridine and 4-vinylpyridine with use of, as an initiator, an organic alkali metal represented by the formula:

YAlk wherein Y is the same as defined in General Formula (III) and Alk represents a sodium, lithium, potassium or cesium, such as cumyl potassium, cumyl cesium, n-butyl lithium, s-butyl lithium and benzophenone cesium.

Subsequently, said carbanion-terminated polymer is subjected to an addition reaction with the vinyl group possessed by said structural unit of General Formula (VI) in said block copolymer, whereby a desired block-graft copolymer is produced.

The anionic polymerization of the monomer may be preferably carried out in an ether type solvent such as THF or a hydrocarbon type solvent such as benzene.

The addition reaction of the carbanion-terminated polymer and the block copolymer can be conducted, for example, by mixing a solution containing the carbanion-terminated polymer with a solution containing the block copolymer in an ether type solvent such as THF on a hydrocarbon type solvent such as benzene and toluene and keeping the mixed solution at 0° to 30° C. for about 3 to 10 hours, whereby the block-graft copolymer is produced.

The Y in General Formulas (III) and (IV) originates from an organic residual group in the above initiator. The block-graft copolymer thus formed can be separated by pouring the reaction mixture into methanol to effect precipitation, followed by drying. In this reaction, the vinyl group may be controlled to be about 4 fold equivalent of carbanion, whereby a block-graft copolymer containing no unreacted homopolymer prepared for the side chain can be obtained. Formation of the desired block-graft copolymer can be confirmed by infrared spectrum, $^1$H-NMR spectrum and GPC.

EXAMPLES

Example 1

(1) Synthesis of block copolymer of styrene and 4-vinylphenyldimethylvinylsilane In a high vacuum of $10^{-6}$ Torr, 532 ml of tetrahydrofuran, $1.88 \times 10^{-4}$ mole of cumyl cesium as an initiator and $9.78 \times 10^{-4}$ mole of N-methylpyrrolidine were charged into a 1 lit. flask.

To the resulting mixed solution, at −78° C., 12.9 ml of styrene diluted with 85 ml of tetrahydrofuran were added and polymerization was carried out for 30 minutes under stirring. The reaction mixture turned red.

Subsequently, 16.7 ml of 4-vinylphenyldimethylvinylsilane diluted with 78 ml of tetrahydrofuran was added thereto. The resulting reaction mixture was stirred for 15 minutes to proceed with the polymerization. This reaction mixture also turned red.

After the polymerization was completed, the reaction mixture was poured into methanol to precipitate and separate the resulting polymer, followed by drying to obtain 25 g of a white polymer.

IR spectrum and $^1$H-NMR spectrum of the resulting polymer were measured to find that it showed the characteristic absorption as set out below and the GPC elution curve as shown in FIG. 1.

IR (cm$^{-1}$): 820, 1250(Si(CH$_3$)$_2$); 1600(SiCH=CH$_2$); 700, 770, 835(benzene ring).

$^1$H-NMR (δ, ppm): 0.27(Si(CH$_3$)$_2$); 5.8, 6.0(SiCH=CH$_2$); 6.5, 7.0(benzene ring).

From $^1$H-NMR it was confirmed that the polymer comprised 44% of styrene and 56% of 4-vinylphenyldimethylvinylsilane, and, from the GPC elution curve, was a single kind of polymer. This polymer had an $\overline{Mn}$ of $14 \times 10^4$.

(2) Synthesis of block-graft copolymer according to addition reaction, Process (a)

In 100 ml of toluene, 2 g of the block copolymer obtained in the above (1) were dissolved, to which 4.4 g of undecamethyl-1-hydropentasiloxane and 3 droplets of a chloroplatinic acid catalyst were added, and the mixture was heated under reflux for 6 hours in a nitrogen atmosphere under stirring. Subsequently, after cooled to room temperature, the reaction mixture was poured into methanol in about 10-fold amount to precipitate a polymer. The polymer was filtered and thoroughly washed with methanol, followed by drying under reduced pressure. Dried polymer was dissolved in benzene, and again precipitated in methanol. This re-precipitation was carried out twice in total, and finally the polymer was freeze-dried from a benzene solution to obtain 3.0 g of a powdery polymer with addition reaction rate of 50%.

The graft chain thereof showed IR and $^1$H-NMR absorptions as follows:

IR (cm$^{-1}$): 840, 1250(Si(CH$_3$)$_2$), 1060(SiOSi).

$^1$H-NMR (δ, ppm): 0.05(Si(CH$_3$)$_2$).

Figure 2:
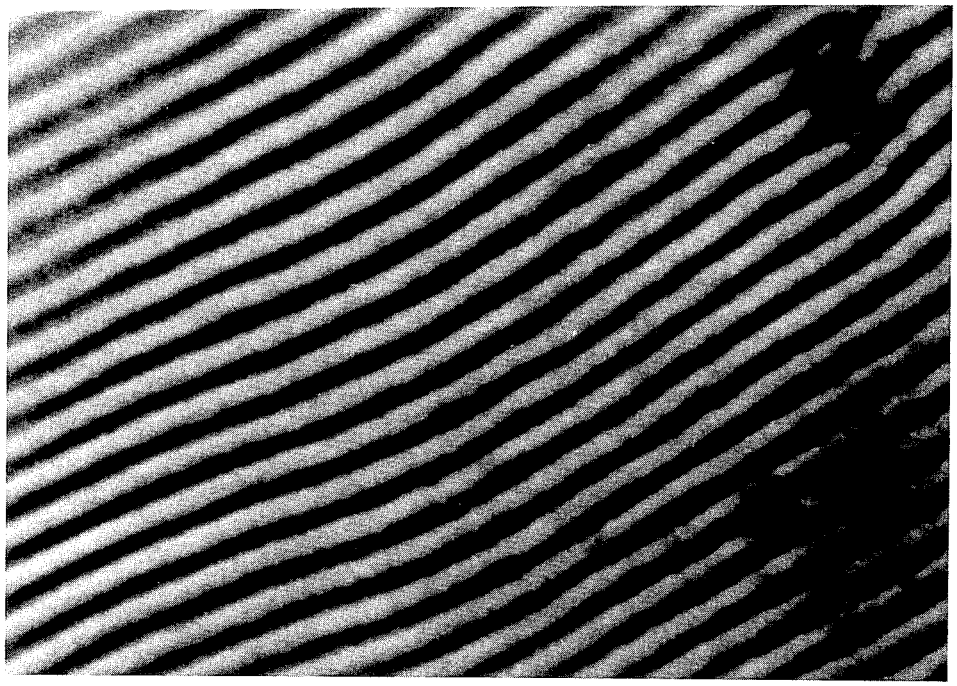
FIG. 2 is an electron microscopic photograph (magnification $10^5 \times$) of a film made of the copolymer of this invention, obtained in Example 1.
Figure 3:
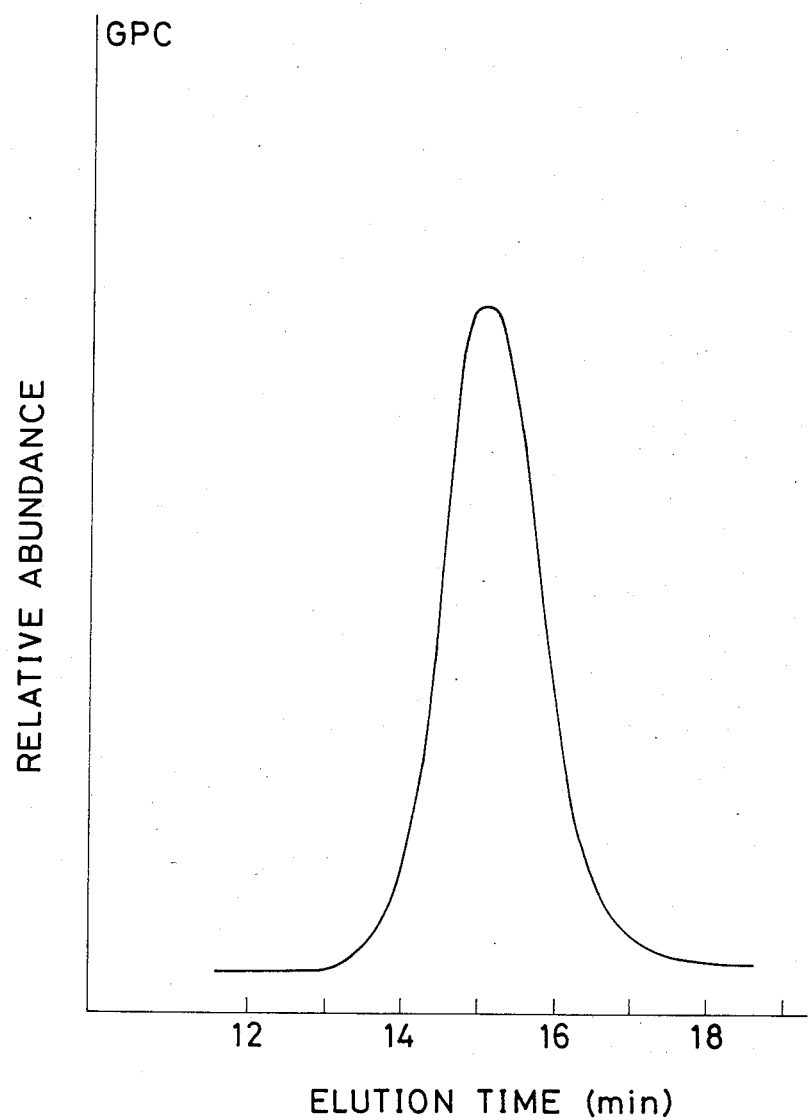
FIG. 3 shows a GPC elution curve of the block-graft copolymer of this invention, obtained in Example 2.

A film of the block-graft copolymer thus obtained was prepared from the benzene solution. An electron microscope photograph of the film was taken as shown in FIG. 2. FIG. 2 shows clear lamella structures with white bands corresponding to the backbone chains and dark bands corresponding to the side chains of polysiloxane.

Example 2

(1) Synthesis of block terpolymer comprising butadiene, 4-vinylphenyldimethylvinylsilane and styrene In a high vacuum of $10^{-6}$ Torr, 970 ml of tetrahydrofuran, $1.30 \times 10^{-4}$ mole of cumyl cesium as an initiator and $7.8 \times 10^{-4}$ mole of N-methylpyrrolidine were charged into a 2 lit. flask. To this mixed solution, at −78° C., 8.8 ml of butadiene was added and polymerization was carried out for 2 hours under stirring. Subsequently, the reaction mixture was diluted with 80 ml of THF. Then 13.4 ml of 4-vinylphenyldimethylvinylsilane were added thereto and polymerization was carried out for 15 minutes under stirring. The solution formed turned red. Subsequently, 12.2 ml of styrene diluted with 90 ml of THF were added thereto and polymerization was carried out for further 10 minutes under stirring. This solution formed also turned red.

After the polymerization was completed, the reaction mixture was poured into methanol, and the resulting polymer was precipitated, followed by drying to obtain 28 g of white polymer.

The resulting polymer showed IR and $^1$H-NMR characteristic absorptions as follows:

IR (cm$^{-1}$): 905, 990(—CH=CH$_2$); 1640(C=C); 820, 1250(Si(CH$_3$)$_2$); 1600(SiCH=CH$_2$); 700, 770, 835 (benzene ring).

$^1$H-NMR ($\delta$, ppm): 5.4, 5.0(—CH=CH$_2$); 0.27(Si(CH$_3$)$_2$); 5.8, 6.0(SiCH=CH$_2$); 6.5, 7.0(benzene ring).

The result of $^1$H-NMR spectroscopy revealed that the polymer was a block copolymer having the composition comprising 20% of butadiene, 42% of 4-vinylphenyldimethylvinylsilane and 38% of styrene. Also, the GPC elution curve had a sharp and single peak as in FIG. 1, and therefore the polymer was confirmed to be a single kind of polymer. This polymer had an $\overline{Mn}$ of $22 \times 10^4$.

(2) Synthesis of block-graft copolymer of poly(butadiene-b-4-vinylphenyldimethylvinylsilane-b-styrene)polymer with polymethyl methacrylate, Process (B)

In 100 ml of tetrahydrofuran, 2 g of poly(butadiene-b-4-vinylphenyldimethylvinylsilane-b-styrene)polymer was dissolved in a high vacuum. On the other hand, polymethyl methacrylate anions for constituting side chains were synthesized according to living anionic polymerization of 4 ml of methyl methacrylate in 30 ml of tetrahydrofuran, at $-78°$ C. and using $8.25 \times 10^{-5}$ mole of benzophenone cesium as an initiator.

Graft polymerization was carried out in high vacuum, using 150 ml of tetrahydrofuran as a solvent, at $-78°$ C., and by adding a solution of polymethyl methacrylate anions to a solution of block copolymer. The reaction was carried out for 15 hours under stirring. After the reaction was completed, the reaction mixture was concentrated, and thereafter a polymer formed was precipitated and separated in methanol, followed by drying to obtain 3 g of the copolymer. GPC elution curve of the resulting copolymer is shown in FIG. 2. From the GPC elution curve, the polymer was confirmed to be a single kind of polymer. Also, this polymer had an $\overline{Mn}$ of $21 \times 10^4$.

The side chain of the resulting copolymer showed IR and $^1$H-NMR absorptions as follows:

IR (cm$^{-1}$): 1730(C=O), 1485(C—$\alpha$—CH$_3$); 1150, 1195(C—O—C).

$^1$H-NMR ($\delta$, ppm): 3.6(OCH$_3$); 1.2($\alpha$—CH$_3$).

Example 3

Synthesis of graft copolymer of poly(styrene-b-4-vinylphenyldimethylvinylsilane)-polymer with polyisoprene, Process (b)

In 70 ml of tetrahydrofuran, 1.5 g of the block copolymer, poly(styrene-b-4-vinylphenyldimethylvinylsilane) obtained in Example 1, were dissolved in a high vacuum.

On the other hand, polyisoprenyl anions for constituting side chains were synthesized according to living anionic polymerization of 11 g of isoprene in 30 ml of tetrahydrofuran with use of $6 \times 10^{-4}$ mole of cumyl cesium as an initiator.

Graft polymerization was carried out in a high vacuum, using 140 ml of tetrahydrofuran as a solvent, at $-78°$ C., and by adding a tetrahydrofuran solution of poly(styrene-b-4-vinylphenyldimethylvinylsilane) and the polyisoprenyl anion solution obtained above. The reaction was carried out for 24 hours under stirring. After the reaction was completed, the product formed was separated by pouring the reaction mixture in methanol to precipitate the product. The resulting polymer was purified by fractional precipitation in a cyclohexane/n-butanol system to isolate 4.5 g of a graft copolymer. This polymer showed a GPC elution curve having a sharp and single peak as in FIG. 2, and therefore it was confirmed to be of monodisperse molecular weight distribution. Also this polymer had an $\overline{Mn}$ of $43 \times 10^4$.

The graft chain of the resulting block-graft copolymer showed IR and $^1$H-NMR absorptions as follows:

IR (cm$^{-1}$):

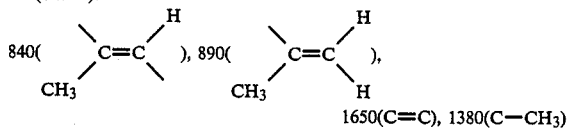

1650(C=C), 1380(C—CH$_3$)

$^1$H—NMR ($\delta$, ppm):

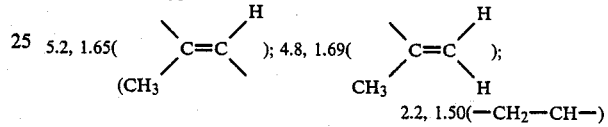

2.2, 1.50(—CH$_2$—CH—)

We claim:

1. A block-graft copolymer comprising:
a polymer block having a repeating unit represented by General Formula (I):

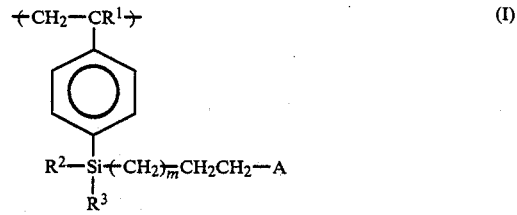

wherein R$^1$ represents a hydrogen atom, methyl group or ethyl group; R$^2$ and R$^3$ may be the same or different and each represent an alkyl group having 1 to 3 carbon atoms or phenyl group; m represents an integer of 0 to 4; and A represents any one of polymer residual groups represented by General Formulas (II) to (IV) shown below,

wherein R$^4$ may be the same or different and each represent methyl group, ethyl group or phenyl group; R$^5$ is as defined for R$^4$ or represents a group represented by the formula —Si(R$^4$)$_3$; and n is an integer of 1 to 1,000,

wherein $R^6$ represents a hydrogen atom or methyl group; and B represents a group represented by the formula —COOR$^2$, where $R^2$ is as defined above,

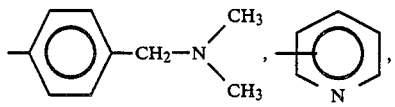

—CH=CH$_2$ or —C(CH$_3$)=CH$_2$; Y represents cumyl group, n-butyl group, s-butyl group or benzophenone residual group; and n is as defined above,

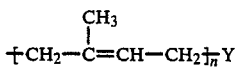 (IV)

wherein Y represents cumyl group, n-butyl group or s-butyl group, and n is as defined above,
and at least one of polymer blocks having a repeating unit represented by General Formula (V):

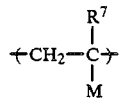 (V)

wherein $R^7$ represents a hydrogen atom, methyl group or ethyl group; M represents at least one selected from a group represented by the formula —CH=CH$_2$, —C(CH$_3$)=CH$_2$, —COOCH$_3$ or —COOC$_2$H$_5$ and phenyl group.

2. A block-graft copolymer as claimed in claim 1, wherein the polymer block having a repeating unit represented by General Formula I has a polymerization degree of at least 10.

3. A block-graft copolymer as claimed in claim 1, wherein the polymer block having a repeating unit represented by General Formula V has a polymerization degree of at least 300.

4. A block-graft copolymer as claimed in claim 2, wherein the polymer block having a repeating unit represented by General Formula V has a polymerization degree of at least 300.

* * * * *